March 19, 1963  F. D. EZEKIEL ET AL  3,082,046
SELF-ALIGNING SHAFT BEARING SUPPORT
Filed May 26, 1961  4 Sheets-Sheet 1

INVENTORS
R. LANGDON WALES
FREDERICK D. EZEKIEL
BY
Kenway, Jenney & Hildreth
ATTORNEYS March 19, 1963  F. D. EZEKIEL ET AL  3,082,046
SELF-ALIGNING SHAFT BEARING SUPPORT
Filed May 26, 1961  4 Sheets-Sheet 2

INVENTORS
R. LANGDON WALES
FREDERICK D. EZEKIEL
BY
*Kenway, Jenney & Hildreth*

ATTORNEYS

INVENTORS
R. LANGDON WALES
FREDERICK D. EZEKIEL
BY
ATTORNEYS

United States Patent Office 3,082,046
Patented Mar. 19, 1963

3,082,046
SELF-ALIGNING SHAFT BEARING SUPPORT
Frederick D. Ezekiel, Waltham, and R. Langdon Wales, Lincoln, Mass., assignors to Northrop Corporation, Beverly Hills, Calif., a corporation of California
Filed May 26, 1961, Ser. No. 113,005
12 Claims. (Cl. 308—140)

This invention relates to a novel self-aligning bearing support, and has as its primary object the provision of an improved self-aligning bearing support which sustains substantial axial loads on a sleeve element and restrains radial movement of the sleeve and the supported shaft at one point along the axis of rotation, while accommodating canting self-aligning movement of the sleeve about that point. It is a further object of the invention to provide an improved self-aligning bearing support having means for sustaining substantial loadings applied to the bearing along the axis of a shaft rotatably supported therein. Further objects and advantages of the invention will become apparent as the following description proceeds.

According to a feature of the invention, a sleeve member, which may comprise a journal bearing and/or a thrust bearing, is supported, together with a shaft rotatably mounted in the sleeve member, in a gimbal ring by means of a pair of pivotal links, for rotation about a first axis radial to the shaft axis. The gimbal ring is supported in a support member or housing by a further pair of links circumferentially spaced from the first pair about the shaft axis, for rotation about another axis mutually perpendicular to the first axis and the shaft axis. The links are not adapted to precisely locate the sleeve against radial displacement; according to a further feature of the invention, radial support means may be provided to precisely center the sleeve radially at a point spaced along the axis of the shaft. These means are arranged to permit canting movement of the sleeve and the shaft about this point, and may be of various types, including tension rods connected tangentially or radially to the sleeve, or compression shoes engaging the sleeve at circumferentially-spaced points lying in a single plane transverse thereto.

The improved bearing support of the invention is particularly adapted to support the sleeve member against large axial loadings, such as may be encountered in applications in which the bearing supports a shaft extending through a wall to whose opposite sides fluids under substantially different pressures are ambient. In such instances, annular sealing means may be provided to prevent leakage of fluid through a clearance space between the sleeve and the housing. The improved bearing support may be combined with a protective sealing device described in a co-pending application Ser. No. 173,003 of W. A. Jones et al. for a Fluid-Sealing Self-Aligning Journal Bearing, filed February 13, 1962, and assigned to the assignee of this application. In accordance with the Jones et al. application, sealing surfaces are arranged in axially-confronting relation upon the sleeve and the housing in normally spaced-apart juxtaposition, for sealing engagement upon the application of an excessive axial loading to the sleeve. These surfaces are preferably in the form of spherical segments so that canting self-aligning movement of the sleeve may take place even though they are in sealing engagement.

To permit axial movement of the sleeve under such excessive loads for seating of the sealing surfaces, according to a further feature of the present invention we provide an axially-compressible connection of either the sleeve or the housing with the corresponding one of the aforementioned pairs of pivotal links. The axially-compressible connecting means may include spring means resiliently urging the links axially with respect to the gimbal ring, arranged to permit axial displacement of the sleeve with respect to the housing.

While the specification concludes with claims particularly pointing out and distinctly claiming the subject matter which we regard as our invention, it is believed that the invention, as well as further objects and advantages thereof, will be more clearly understood from the following detailed description of preferred embodiments thereof, referring to the accompanying drawings, in which:

Figure 1:
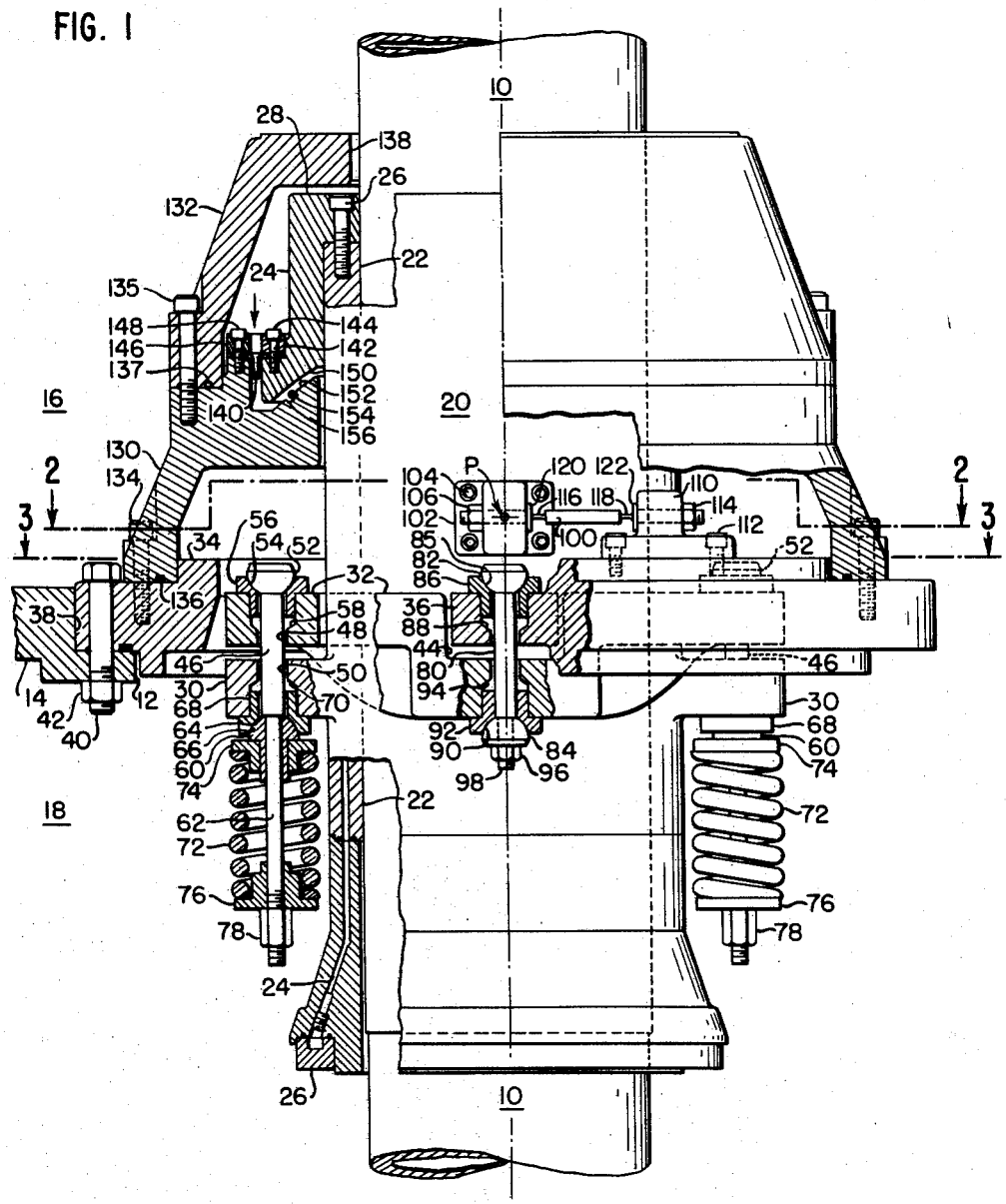
FIG. 1 is a view in elevation and partially in section of a preferred form of the bearing support.
Figure 2:
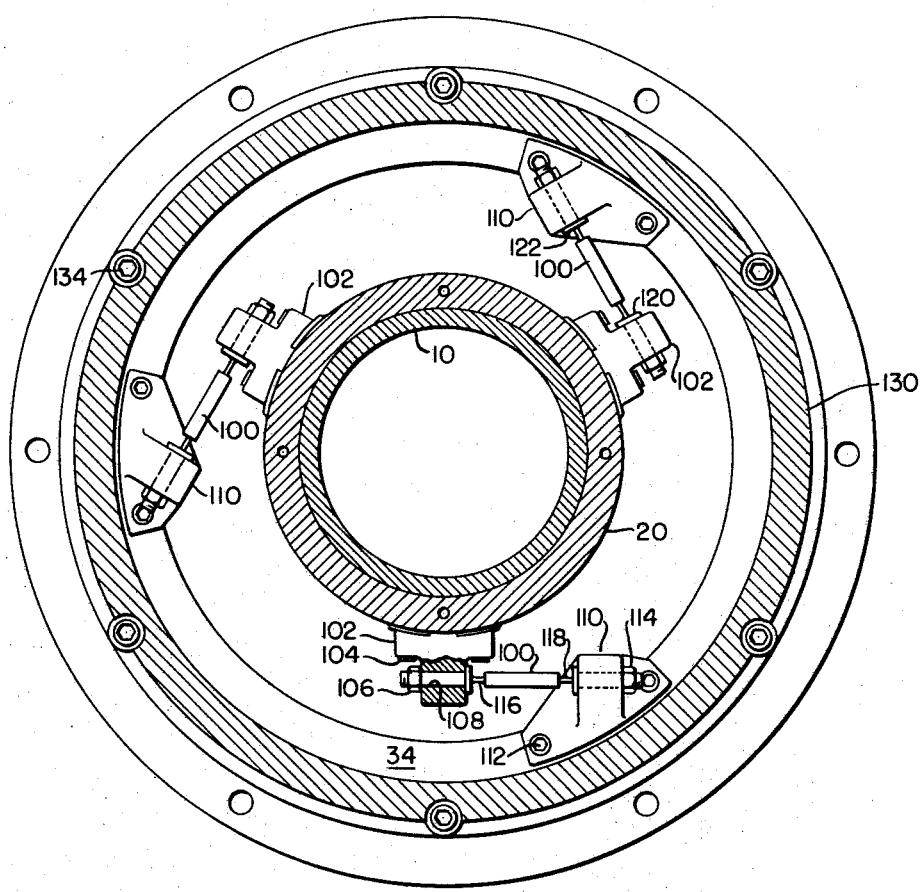
FIG. 2 is a sectional view taken along line 2—2 in FIG. 1, looking in the direction of the arrows.
Figure 3:
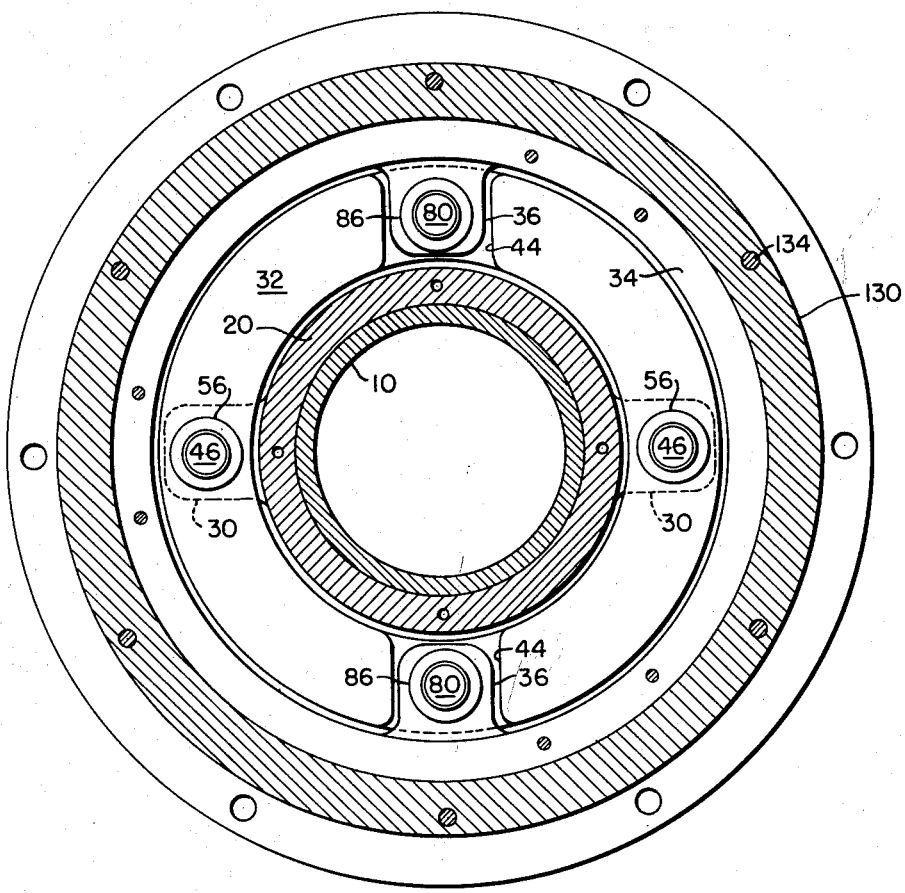
FIG. 3 is a sectional view taken along line 3—3 in FIG. 1, looking in the direction of the arrows.

Referring to FIGS. 1–3, there is shown a preferred embodiment of the invention by means of which a shaft 10 is rotatably and slidably supported in an opening 12 of a wall 14 to opposite sides of which are ambient fluids 16 and 18, which may be subject to substantial differences in pressure. The wall 14 may, for example, comprise the hull of a submarine, the fluid 16 may comprise sea water under a substantial pressure, and the shaft 10 may constitute a periscope which is to be supported for canting movement about a point P lying along the axis shown, and restrained against radial movement in a radial plane intersecting the axis at this point. According to the invention, a sleeve member 20, having a cylindrical bearing surface 22 slidably receiving the shaft 10 therein, is supported in a self-aligning manner for canting movement with the shaft. The bearing may be of a hydrostatic type well-known in the art, and is provided with a hydraulic fluid passage 24 and a distributing manifold 26 for this purpose. However, a plain bearing may be substituted if desired; the particular form of the bearing surface is not critical to the invention, and no further detailed description thereof is believed necessary. In the application of the improved bearing support to a fluid-sealing bearing arrangement such as is shown, it is necessary that the bearing be of a type which prevents leakage of the external fluid 16 through the wall, and a hydrostatic bearing is preferred for its fluid sealing ability as well as its low friction characteristics.

The sleeve member presents a pressure surface to the fluid 16, and the fluid therefore applies an axial load upon the sleeve. Furthermore, the sleeve may be of substantial weight, particularly where large bearing loads must be supported by a bearing surface of substantial area. In the embodiment shown, an annular cap 24 is secured axially upon the sleeve by means of a circumferential row of machine screws 26, and the cap presents a fluid pressure surface 28 which is exposed to the fluid 16.

To support the sleeve for canting self-aligning movement with the shaft 10, we form the sleeve with a first pair of ears 30, spaced 180° apart circumferentially about the sleeve. A gimbal ring 32 is provided for supporting the sleeve in a support member or housing 34, which is provided with a further pair of ears 36 spaced 180° apart circumferentially thereabout, and equally spaced from the ears 30. The housing is secured in fluid-sealing engagement in a suitable recess 38 extending circumferentially about the opening 12, by means of a row of bolts 40 and nuts 42. The gimbal ring 32 extends about the sleeve with axial clearance from the first ears 30, and is formed with enlarged recesses 44 receiving the further ears 36 with substantial clearance therein.

The sleeve 20 is suspended from the gimbal ring 32 by means of a pair of pivotal links 46, each extending with substantial clearance through an opening 48 formed in the gimbal ring 32 and an opening 50 formed in the corresponding ear 30. Each link is formed with a spherical enlargement 52 at an upper end thereof, received rockably in a mating recess 54 formed in a hardened insert 56, which is mounted in a recess 58 formed in the gimbal ring. A ferrule 60 is received upon a reduced portion 62 of the lower end of each link 46 and is formed with a spherical surface 64 rockably received in a spherical surface 66 formed in a hardened insert 68, one of which is press-fitted into a recess 70 formed in each ear 30. This connection is arranged to permit some axial movement of the sleeve for the operation of sealing means hereinafter to be described. To this end, the ferrule 60 is slidably received on the reduced portion 62, and is urged upwardly thereon by a compression spring 72, compressed between a pair of thimbles 74 and 76. The assembly is retained by means of a nut 78 threaded on the lower end of the link.

The gimbal ring 32 is supported in an essentially similar manner in the ears 36 of the housing by means of a pair of pivotal links 80, but without provision for relative axial movement. Each of the links 80 is formed at its upper end with a spherical enlargement 82, and at its bottom end has a spherical enlargement 84. The enlargement 82 of each link is received in rockable engagement with a mating surface 85 formed in a hardened insert 86, which is received in a recess 88 of the ear 36; and the enlargement 84 of each link cooperates in a similar manner with a mating surface 90 formed in a hardened insert 92 which is received in a recess 94 formed in the gimbal ring. Each assembly is secured by means of a nut 96 threadedly engaged with a lower end 98 of the corresponding link.

In this manner, the sleeve is supported for universal canting movement in the housing 34, in a manner to accept substantial axial loads imposed on the sleeve by its own weight or by the pressure of the fluid 16 acting on the surface 28. However, the pivotal links shown are not well suited to accept radial loads imposed on the sleeve by the shaft, and for this purpose we provide a plurality of circumferentially-spaced means for radially supporting and precisely centering the sleeve in a plane radial to the shaft axis at the point P. In the preferred embodiment shown, these means comprise three tension leaves 100, circumferentially spaced at equal intervals about the sleeve and secured thereto by means of a plurality of lugs 102 fastened to the sleeve by bolts 104. Each tension leaf is secured in a corresponding lug by means of a nut 106 threaded on the end of the leaf, which passes through a suitable opening 108 formed in the lug. The opposite ends of the leaves are secured to the housing by means of a plurality of lugs 110, secured to the housing by means of bolts 112. An end of each leaf is secured by a nut 112 threaded thereon in a corresponding lug 110. Each of the leaves is formed with reduced portions 116 and 118 terminating in enlarged compression plates 120 and 122, with the result that the leaves accept only loads in tension or compression along their axes, but do not substantially restrain the sleeve against axial or canting movement. The leaves are positioned tangentially to the sleeve, but it will be apparent that the vectorial distribution of applied loads between the various leaves is such that the sleeve is supported against radial movement by tension or compression of the leaves. The combination of the leaves with the pivotal link mountings supports the sleeve against axial movement and against radial movement in a plane radial to the axis of the sleeve at the point P, but permits the sleeve to follow canting movements of the shaft occurring about axes radial to the sleeve axis at the point P.

For sealing the wall against leakage of the external fluid 16 therethrough, we prefer to utilize sealing means arranged in accordance with the aforementioned co-pending application of W. A. Jones et al. For this purpose, the housing 34 incorporates further annular housing members 130 and 132, secured thereon in axially-stacked relation by means of circumferentially-spaced rows of bolts 134 and 135, respectively. A pair of flexible O-ring seals 136 and 137 are interposed between the successive housing members to seal the assembly. The housing member 132 protects the sleeve against mechanical injury, and is formed with an opening 138 extending about the shaft, through which the fluid 16 passes to reach the surface 28. A primary sealing member 140, comprising a flexible annular diaphragm, is secured in sealing engagement about the inner and outer peripheries thereof upon the annular cap 24 and the housing member 130, by means of a ring 142 and a row of machine screws 144, and by means of a ring 146 and a row of machine screws 148, respectively.

In ordinary operation, the sealing member 140 is sufficient to seal the bearing against leakage of the fluid 16, and the compression of the springs 72 supports the sleeve in axially spaced-apart relation to the housing as shown. However, in the event that an external fluid pressure in excess of that for which the sealing member was designed is encountered, back-up sealing means operate to prevent leakage of the fluid by rupture of the sealing member. These means comprise axially-aligned mating spherical surfaces 150, formed in the cap 24, and 152, formed in the housing member 130. A flexible O-ring seal 154 is received in an annular recess 156 formed about the surface 152 to assist in the sealing action. An excessive pressure of the fluid 16 acts upon the pressure surface 28 to drive the sleeve axially downwardly against the bias of the compression springs 72, until the surfaces 150 and 152 abut in sealing engagement to terminate the movement. The abutment of these surfaces seals the bearing against leakage. Their spherical form, which is preferably generated about the point P, permits canting self-aligning movement of the sleeve to continue. While the arrangement of the sealing surfaces forms no part of the present invention, it is to be observed that the arrangement of the springs 72 with the pivotal link mounting of the sleeve permits sufficient axial movement of the sleeve to allow their sealing cooperation to occur.

Figure 4:
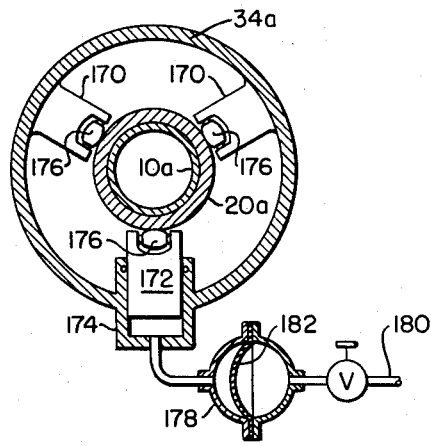
FIG. 4 is a schematic plan view of a modified form of radial support means.
Figure 5:
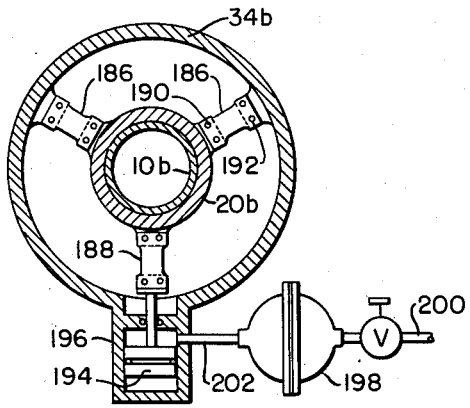
FIG. 5 is a schematic plan view of still another form of radial support means.

Referring to FIGS. 4 and 5, alternative arrangements of means for radially supporting and centering the sleeve are shown. In FIG. 4, a pair of fixed shoes 170 are secured within the housing, and a third shoe 172 forms the movable piston of a cylinder 174 mounted in the housing. The shoes are circumferentially spaced at equal intervals about a sleeve 20a. Each of the fixed and movable shoes has a roller 176 secured upon the protruding end thereof, to bear upon the sleeve for facilitating canting movement thereof. A pressure accumulator schematically illustrated at 178 is charged to a pre-selected gas pressure by means of an inlet conduit 180, and has a flexible diaphragm 182 for applying the pre-selected pressure to hydraulic fluid contained within the cylinder 174, and thence to the movable shoe 172. The movable shoe thus applies a uniform compression upon the sleeve for a positive centering action.

Referring to FIG. 5, the radial support means may comprise a plurality of fixed leaves 186 and a movable leaf 188, each of the fixed and movable leaves being secured to the sleeve 206 by bolts 190. The fixed leaves are secured upon the housing 34b by means of bolts 192, while the movable leaf 188 is drivingly connected with a tensioning piston 194 slidably received in a cylinder 196, which is stationarily supported in the housing. Again, an accumulator 198 is charged to a pre-selected pressure by means of an inlet conduit 200, to apply that pressure through a conduit 202 to the piston 194. The operation of these radial supporting means is similar to that of the previous embodiment, but the positive centering force is applied to the sleeve in tension rather than in compression.

Figure 6:
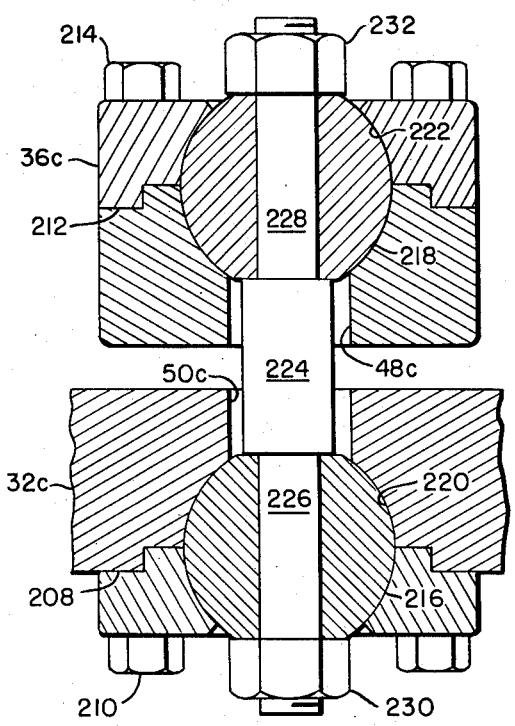
FIG. 6 is an elevation in section of a fragmentary portion of bearing support means showing a modified form of a pivotal link.

Referring to FIG. 6, there is shown an alternative arrangement of a pivotal link for positively spacing the gimbal ring axially with respect to the sleeve and/or the housing. The modified link is shown in assembled relation to the gimbal ring and an ear of the housing for purposes of illustration; however, it will be apparent that similar links may be used to connect the sleeve with the gimbal ring if desired. The gimbal ring 32c is radially split at 208 and the halves are secured by a plurality of bolts 210, and the ears 36c of the housing are transversely split at 212 and secured by a plurality of bolts 214, to receive a pair of spherical balls 216 and 218 in mating recesses 220 and 222 thereof, respectively. A pivotal link 224 is formed with reduced portions 226 and 228 for locating the balls 216 and 218 thereon in axially-spaced relation. The assembly of the pivotal link with the balls is secured by bolts 230 and 232 threaded on the opposite ends of the link. The clearances 48c and 50c permit relative rocking movement of the balls with respect to their mating recesses to take place. Similar link assemblies (not shown) may alternatively or conjunctively be utilized if desired for positively spacing the gimbal ring axially with respect to the sleeve.

While we have illustrated and described preferred embodiments of our invention by way of illustration, it will be apparent that varous changes and modifications will readily occur to those skilled in the art without departing from the true spirit and scope of our invention, which we intend to define in the appended claims without limitation to specific structures and arrangements thereof herein described.

What we claim and desire to secure by Letters Patent of the United States is:

1. A self-aligning shaft bearing support comprising, in combination; a sleeve having an internal bearing surface for receiving a shaft for rotation about a first axis longitudinal of said sleeve, a gimbal ring, a first pair of elongated links pivotally supporting said sleeve in said gimbal ring for rotation about a second axis normal to said first axis, a support member, and a further pair of elongated links pivotally supporting said gimbal ring in said support member for rotation about a third axis normal to said second axis said links and said gimbal ring cooperating to support said sleeve for movement radially of said first axis with respect to said support member.

2. A self-aligning shaft bearing support comprising, in combination; a sleeve having an internal bearing surface for receiving a shaft for rotation about a first axis longitudinal of said sleeve, a gimbal ring extending about said sleeve transversely to said axis, a first pair of elongated links spaced apart about said sleeve and pivotally supporting said sleeve in said gimbal ring for rotation about a second axis normal to said first axis, and a further pair of elongated links spaced apart about said sleeve and pivotally connected to said gimbal ring, said further pair of links being arranged in circumferential alternation with said first pair of links to pivotally support said gimbal ring for rotation about a third axis normal to said second axis and for movement in directions radial to said first axis with respect to said support member.

3. A self-aligning shaft bearing support comprising, in combination; a sleeve having an internal bearing surface for receiving a shaft for rotation about a first axis longitudinal of said sleeve, a gimbal ring, means pivotally connecting said sleeve with said gimbal ring for rotation about a second axis normal to said first axis, further means pivotally supporting said gimbal ring for rotation about a third axis normal to said second axis, and radial support means constructed and arranged to radially restrain said sleeve in a plane intersecting said first axis, for canting movement of said sleeve about axes normal to said first axis and lying in said plane.

4. A self-aligning shaft bearing support comprising, in combination; a sleeve having an internal bearing surface for receiving a shaft for rotation about a first axis longitudinal of said sleeve, a gimbal ring, a first pair of links pivotally connecting said sleeve with said gimbal ring for rotation about a second axis normal to said first axis, a further pair of links pivotally supporting said gimbal ring for rotation about a third axis normal to said second axis, and radial support means constructed and arranged to radially restrain said sleeve in a plane intersecting said first axis, for canting movement of said sleeve about axes normal to said first axis and lying in said plane.

5. A self-aligning shaft bearing support comprising, in combination; a sleeve having an internal bearing surface for receiving a shaft for rotation about a first axis longitudinal of said sleeve, a gimbal ring, a first pair of links pivotally supporting said sleeve in said gimbal ring for rotation about a second axis normal to said first axis, a support member, a further pair of links pivotally supporting said gimbal ring in said support member for rotation about a third axis normal to said second axis, and radial support means circumferentially spaced about said sleeve and mounted on said support member, said support means peripherally engaging said sleeve for radial restraint thereof in a plane intersecting said first axis, to center said sleeve about said first axis for canting movement thereof about axes radial to said first axis and lying in said plane.

6. A self-aligning shaft bearing support as recited in claim 5, in which said radial support means comprises a plurality of transversely flexible tension members extending tangentially to the periphery of said sleeve.

7. A self-aligning shaft bearing support as recited in claim 5, in which said radial support means comprises a plurality of transversely flexible tension members extending radially to the periphery of said sleeve.

8. A self-aligning shaft bearing support as recited in claim 5, in which said radial support means comprises a plurality of compression shoes circumferentially spaced about the periphery of said sleeve to compressionally engage the periphery of said sleeve, at least one of said shoes being radially movable with respect to said sleeve, and means yieldingly biasing said movable shoe into engagement with said sleeve.

9. A self-aligning shaft bearing support as recited in claim 5, in which said radial support means comprises a plurality of transversely flexible tension members circumferentially spaced about said sleeve, together with means for applying a preselected load in tension longitudinally of at least one of said tension members, in a direction away from said sleeve.

10. A self-aligning shaft bearing support comprising, in combination; a sleeve having an internal bearing surface for receiving a shaft for rotation about a first axis longitudinal of said sleeve, a gimbal ring, a first pair of links pivotally connecting said sleeve with said gimbal ring for rotation about a second axis normal to said first axis, a support member, and a further pair of links pivotally connecting said gimbal ring with said support member for rotation about a third axis normal to said second axis, said pivotal connection of one of said pairs of links including axially-compressible means yieldingly biasing said sleeve along said first axis with respect to said support member.

11. A self-aligning shaft bearing support as recited in claim 10, together with axially confronting sealing surfaces formed on said sleeve and said support member, said sealing surfaces being axially spaced apart in a normal juxtaposition of said sleeve to said support member, and being adapted to abut in sealing engagement upon an axial movement of said sleeve in one direction with respect to said support member.

12. A self-aligning shaft bearing support comprising, in combination; a sleeve having an internal bearing surface for receiving a shaft for rotation about a first axis longitudinal of said sleeve, a gimbal ring, a first pair of links pivotally connecting said sleeve with said gimbal ring for rotation about a second axis normal to said first axis, a support member, a further pair of links pivotally connecting said gimbal ring with said support member for rotation about a third axis normal to said second axis, said pivotal connection of one of said pairs of links including axially-compressible means yieldingly biasing said sleeve along said first axis with respect to said support member, and radial support means circumferentially spaced about said sleeve and mounted on said support member, said support means peripherally engaging said sleeve for radial restraint thereof in a plane intersecting said first axis, to center said sleeve about said first axis for canting movement thereof about axes radial to said first axis and lying in said plane.

References Cited in the file of this patent

UNITED STATES PATENTS

| | | |
|---|---|---|
| 422,020 | Jacquin | Feb. 25, 1890 |
| 1,838,615 | Greve | Dec. 29, 1931 |